(12) United States Patent
Kriener et al.

(10) Patent No.: US 10,127,634 B2
(45) Date of Patent: Nov. 13, 2018

(54) IMAGE EDITING AND REPAIR

(71) Applicant: Google LLC, Mountain View, CA (US)

(72) Inventors: Florian Kriener, Lübeck (DE); Nils Kokemohr, Hamburg (DE)

(73) Assignee: Google LLC, Mountain View, CA (US)

( * ) Notice: Subject to any disclaimer, the term of this patent is extended or adjusted under 35 U.S.C. 154(b) by 74 days.

(21) Appl. No.: 15/090,476

(22) Filed: Apr. 4, 2016

(65) Prior Publication Data

US 2016/0300327 A1  Oct. 13, 2016

Related U.S. Application Data

(60) Provisional application No. 62/144,814, filed on Apr. 8, 2015.

(51) Int. Cl.
  *G06K 9/40* (2006.01)
  *G06T 5/00* (2006.01)
  *G06T 11/60* (2006.01)
  *H04N 5/232* (2006.01)

(52) U.S. Cl.
  CPC .............. *G06T 5/001* (2013.01); *G06T 5/005* (2013.01); *G06T 11/60* (2013.01); *H04N 5/23293* (2013.01)

(58) Field of Classification Search
  CPC ......... G06T 11/60; G06T 5/001; G06T 5/005; H04N 5/23293
  USPC ....................................................... 382/275
  See application file for complete search history.

(56) References Cited

U.S. PATENT DOCUMENTS

| 7,577,313 B1 | 8/2009 | Georgiev |
| 8,380,005 B1 * | 2/2013 | Jonsson .................. G06T 11/60 382/282 |
| 2008/0170807 A1 | 7/2008 | Kokemohr |
| 2013/0127903 A1 | 5/2013 | Paris |

FOREIGN PATENT DOCUMENTS

WO    2010/129705    11/2010

OTHER PUBLICATIONS

Barrett et al. "Intelligent Scissors for Image Composition," SIGGRAPH '95 Proceedings of the 22nd annual conference on Computer graphics and interactive techniques, New York, NY, USA, 1995, 191-198 pags.
Barrett et al. "Interactive Segmentation with Intelligent Scissors," Graphical Models and Image Processing, vol. 60, Issue 5, Sep. 1998, 349-384 pags.

(Continued)

*Primary Examiner* — Manuchehr Rahmjoo
(74) *Attorney, Agent, or Firm* — IP Spring

(57) ABSTRACT

A method for healing a target region on an input image is described. A preview image is received; the preview image may reflect a down-sampled image of an original image. The method determines a target region for the preview image. The target region indicates a segment of the preview image designated for healing. The method may then heal the target region associated with the preview image using a transformation. The method may store one or more parameters associated with the healed preview image. The method may then provide for display the healed preview image to a user on a mobile device.

18 Claims, 9 Drawing Sheets

(56) References Cited

OTHER PUBLICATIONS

Goldman et al. "PatchMatch: A Randomized Correspondence Algorithm for Structural Image Editing," ACM Transactions on Graphics, Aug. 2009, https://www.researchgate.net/publication/220184392, 11 pags.

Jia et al. "Drag-and-drop pasting," SIGGRAPH '06 ACM SIGGRAPH 2006 vol. 25, Issue 3, New York, NY, USA, Jul. 2006, 631-637 pags.

Georgiev, "Photoshop Healing Brush: a Tool for Seamless Cloning," Workshop on Applications of Computer Vision (ECCV 2004), Prague, 2004, May 11, 2004, pp. 1-8.

International Search Report and Written Opinion for PCT Application No. PCT/2016/025913, dated Jul. 5, 2016, 14 pages.

* cited by examiner

IMAGE EDITING AND REPAIR

CROSS-REFERENCE TO RELATED APPLICATIONS

The present application claims priority, under 35 U.S.C. § 119(e), to U.S. Provisional Patent Application No. 62/144,814, filed Apr. 8, 2015, entitled "Image Editing and Repair," which is incorporated by reference in its entirety.

BACKGROUND

Image healing is the process of synthesizing pixels to replace a given set of pixels in an image. Image healing is a well-established image enhancement application for image processing because it allows users to remove artifacts in an image. However, it is difficult to use certain conventional image enhancement techniques on mobile devices with small screen sizes due to the limited space available in preview images on such small screens. These conventional techniques thus often make it necessary to revisit edits made on a mobile device on a device with a larger screen.

SUMMARY

The system and method relate to editing and modifying images. In particular, the system and method relate to image healing. More specifically, the system and method relate to editing and modifying images by healing artifacts from an image.

According to one aspect of the subject matter described in this disclosure, a method for healing a target region on an input image is disclosed. The method includes receiving, using one or more computing devices, image data from a client, the image data including parameters associated with an input image; computing, using the one or more computing devices, a scaling of the parameters of the image data based on a predetermined scaling factor; determining, using the one or more computing devices, a first transformation for a target region associated with the input image; responsive to determining the first transformation for the target region associated with the input image, updating, using the one or more computing devices, the input image based on the transformation; and providing, using the one or more computing devices, the updated input image for display to a user.

In general, another aspect of the subject matter described in this disclosure may be embodied in methods that include receiving a first input from the user for previewing the input image; providing for display a preview image associated with the input image; receiving a second input from the user for a target region associated with the image preview, the target region indicating a segment of the input image to be modified; modifying the segment of the input image; providing for display the modified input image to the user; that the preview image includes a down-sampled image of the input image; identifying a transformation for a search region on the preview image, the search region including the transformation and the target region; determining boundary parameters of the target region and boundary parameters of the search region; analyzing the preview image for boundary parameter similarities between the boundary parameters of the target region and the boundary parameters of the search region; computing a boundary deviation-error for the boundary parameter similarities between the target region and the search region, the boundary deviation-error reflecting a similarity confidence between the boundary parameters of the target region and the boundary parameters of the search region; transforming a set of pixels from the search region on the target region; that transforming the set of pixels from the search region on the target is responsive to the boundary deviation-error satisfying a predetermined pixel threshold; computing a target region refinement using the scaled parameters and seamless cloning; and computing a border refinement for the boundary parameters of the target region using image enhancement.

Other aspects include corresponding methods, systems, apparatus, non-transitory computer readable medium, and computer program products.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

In one implementation, the system and method edit and modify an image, and specifically perform image healing. User devices (e.g., a cellular phone, a tablet, a computer, etc.) suffer from a technical problem in that they tend to have limited processing power and are not always connected to the Internet with a high speed connection. When the user device is connected to the Internet with a low bandwidth connection, the images shared over the low bandwidth Internet connection requires minimizing the size of the file uploaded or downloaded, rather than applying the edits to a full resolution image version because of the limited computing capabilities of the user device and the available bandwidth for sending and receiving the image. For example, if a user requests to edit a 40-megabyte (40 MB) image, the 40 MB file is minimized to 4 MB for transfer to the user device, rather than transferring the 40 MB file. The user edits the 4 MB file on the user device and then transfers that file back to the server. However, the edits made on the 4 MB file may become distorted and altered when the file is increased back to its original 40 MB file size. Those conventional techniques required the user to apply edits on a full resolution version of the image before sharing or uploading, which is not possible with low bandwidth Internet connection typical of computing devices.

The present implementation discussed herein provides a technical solution to the issue of using image enhancement applications on a user device and further provides users the ability to share the edited image with other users in a user association or an online service, for example, on a social network site by determining scaling parameters of an image and determining a transformation for a target region of the image. By using scaling and transformations, images may be minimized and sent to the user device for editing and then up scaled back to full resolution without distorting the image edits.

Figure 1:
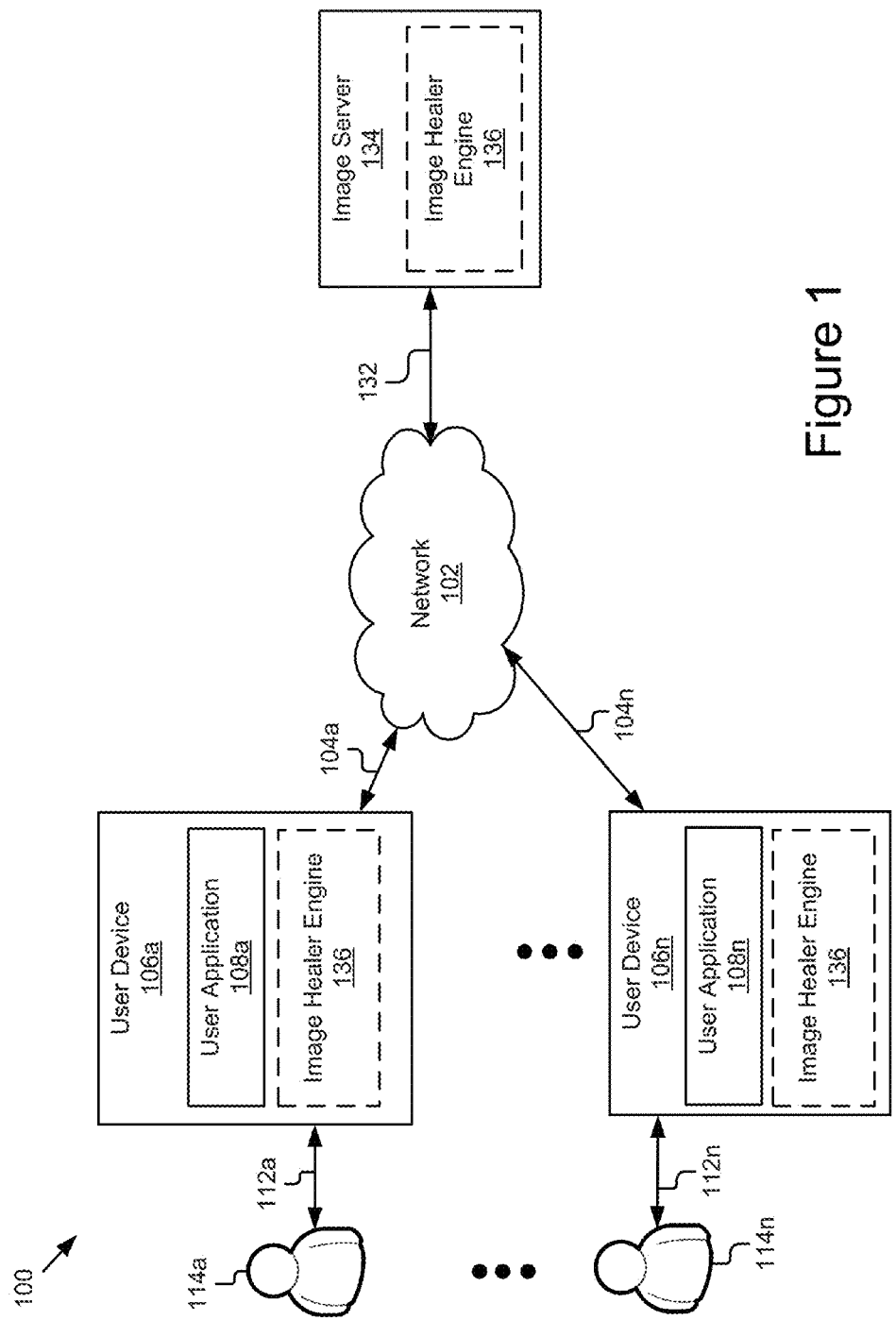
FIG. 1 is a block diagram illustrating an example system for healing an image.

FIG. 1 illustrates a block diagram of an example system 100 for healing an image. In the depicted implementation, the system 100 includes an image server 134 and user devices 106a through 106n. In the depicted implementation, the devices 134 and 106 are electronically communicatively coupled via a network 102. However, the present disclosure is not limited to this configuration and a variety of different system environments and configurations may be employed and are within the scope of the present disclosure. Other implementations may include additional or fewer computing devices, services, and/or networks.

It should be recognized that in FIG. 1 as well as the other figures used to illustrate an implementation, an indication of a letter after a reference number or numeral, for example, "106a" is a specific reference to the element or component that is designated by that particular reference numeral. In the event a reference numeral appears in the text without a letter following it, for example, "106," it should be recognized that such is a general reference to different implementations of the element or component bearing that general reference numeral.

In some implementations, the devices of the system 100 may use a cloud-based architecture where one or more computer functions or routines are performed by remote computing systems and devices at the request of a local computing device. For example, a user device 106 may be a computing device having hardware and/or software resources and may access hardware and/or software resources provided across the network 102 by other computing devices and resources, including, for instance, other user devices 106 and the image server 134, or any other devices of the system 100.

The network 102 may be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some implementations, the network 102 may be a peer-to-peer network. The network 102 may also be coupled to or include portions of a telecommunications network for sending data in a variety of different communication protocols. In some other implementations, the network 102 includes Bluetooth communication networks or a cellular communications network for sending and receiving data including via short messaging service (SMS), multimedia messaging service (MMS), hypertext transfer protocol (HTTP), direct data connection, wireless application protocol (WAP), email, etc. In addition, although FIG. 1 illustrates a single network 102 coupled to the user devices 106 that are illustrated and the image server 134, in practice one or more networks 102 may be connected to these devices.

In some implementations, the user device 106 (any or all of 106a through 106n) are computing devices having data processing and data communication capabilities. In the illustrated implementation, the users 114a through 114n interact with the user device 106a and 106n, via signal lines 112a through 112n, respectively. The user devices 106a through 106n are communicatively coupled to the network 102 via signal lines 104a through 104n respectively. Although two user devices 106 are illustrated, the disclosure applies to a system architecture having any number of user devices 106 available to any number of users 114.

In some implementations, a user device 106 includes a workstation computer, a desktop computer, a laptop computer, a netbook computer, a tablet computer, a smartphone, a set-top box/unit, an Internet Protocol-connected smart TV including a computer processor capable of receiving viewer input, accessing video content on computer networks (e.g., the Internet), and executing software routines to provide enhanced functionality and interactivity to viewers, or the like. In some implementations, the user device 106 may be a handheld wireless computing device which may be capable of sending and receiving voice and/or data communications.

The user device 106 may include a computer processor, a memory, a power source, and a communication unit including one or more network interfaces for interacting with the network 102, including, for example, wireless transceivers to broadcast and receive network data via radio signals. The user device 106 may also include one or more of a graphics processor; a high-resolution touchscreen; a physical keyboard; forward and rear facing cameras; a Bluetooth® module; memory storing applicable firmware; and various physical connection interfaces (e.g., USB, HDMI, headset jack, etc.); etc.

Additionally, an operating system for managing the hardware and resources of the user device 106, application programming interfaces (APIs) for providing applications access to the hardware and resources, a user interface module for generating and displaying interfaces for user interaction and input, and applications including, for example, applications for web browsing, capturing digital video and/or images, etc., may be stored and operable on the user device 106. While FIG. 1 illustrates two or more user devices 106, the present disclosure applies to any system architecture having any number of user devices 106.

In the depicted implementation, the user devices 106a through 106n contain a user application 108 (illustrated as 108a through 108n) executable by a processor (not shown) of the user device 106 to provide for user interaction, and to send and receive data via the network 102. In particular, the user application 108 is operable to instruct the user device 106 to render user interfaces, receive user input, and send information to and receive information from the image server 134, and the other components of the system 100. In these or other implementations, the user application 108 may be stored in memory (not shown) of the user device 106 and is accessible and executable by a processor (not shown). In further implementations, the user device 106 may include an image healer engine 136. The user 114 (114a through 114n) utilizes the user application 108 to exchange information with the image healer engine 136, and the image server 134, as appropriate to accomplish the operations of the present implementations.

The image server 134 may be a computing device that includes a processor, a memory, and network communication capabilities. The image server 134 is coupled to the network 102, via a signal line 132. The image server 134 may be configured to obtain a plurality of images for healing from the user device 106 and/or other components of system 100, via the network 102. Although one image server 134 is shown, it should be understood that multiple servers may be utilized, either in a distributed architecture or otherwise. For the purpose of this application, the system configuration and operations performed by the system are described in the context of a single image server 134.

In some implementations, the image server 134 comprises an image healer engine 136 for image healing. The image healer engine 136 may receive a user input from the user application 108, and then heal an image based on the received user input. For example, the user 114 may provide input indicating a target region (e.g. an unwanted area for a final image) of an image to be healed; the image healer engine 136 may analyze the image and heal the image based on the user input. By way of another example, the user 114 may provide input indicating multiple target regions of an image-frame associated with a video clip to be healed; the image healer engine 136 may analyze each target region in the image-frame individually and/or collectively and heal the plurality of target regions based on the user input.

As depicted in FIG. 1, the image healer engine 136 is shown in dotted lines to indicate that the operations performed by the image healer engine 136 as described herein may be performed either server-side (e.g., image server 134) or user-side (e.g., user devices 106a through 106n), or a combination of the two. Additional structure, acts, and/or functionality of the image healer engine 136 is described in further detail below with respect to at least FIG. 2.

Figure 2:
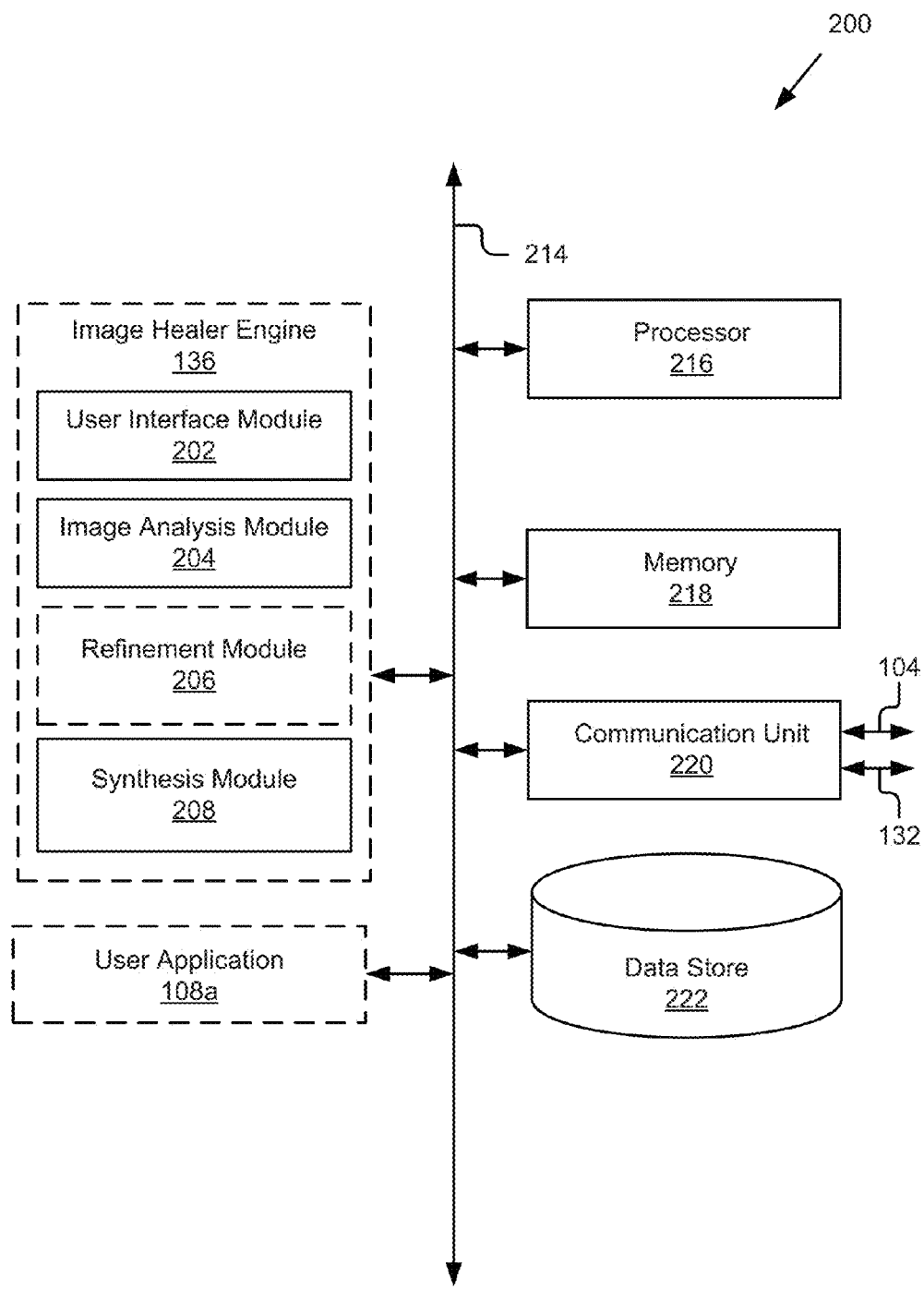
FIG. 2 is a block diagram illustrating an example computing device.

FIG. 2 is a block diagram of an example computing device 200, which may be representative of a computing device included in the image server 134 and/or the user device 106. As depicted, the computing device 200 may include a processor 216, a memory 218, a communication unit 220, a data store 222, and one or more of a user application 108, and an image healer engine 136, which may be communicatively coupled by a communication bus 214.

Depending upon the configuration, the computing device 200 may include different components. For instance, in a server-side implementation, the computing device 200 may include the image healer engine 136. However, in an example client-side implementation, the computing device 200 may include the user application 108, and/or the image healer engine 136. It should be understood that the above configurations are provided by way of example and numerous further configurations are contemplated and possible.

The bus 214 may include a communication bus for transferring data between components of a computing device or between computing devices, a network bus system including the network 102 or portions thereof, a processor mesh, a combination thereof, etc. In some implementations, the user application 108 and the image healer engine 136 may cooperate and communicate via a software communication mechanism implemented in association with the bus 214. The software communication mechanism may include and/or facilitate, for example, inter-process communication, local function or procedure calls, remote procedure calls, network-based communication, secure communication, etc.

The processor 216 may execute software instructions by performing various input, logical, and/or mathematical operations. The processor 216 may have various computing architectures to method data signals including, for example, a complex instruction set computer (CISC) architecture, a reduced instruction set computer (RISC) architecture, and/or an architecture implementing a combination of instruction sets. The processor 216 may be physical and/or virtual, and may include a single core or plurality of processing units and/or cores. In some implementations, the processor 216 may be capable of generating and providing electronic display signals to a display device, supporting the display of images, capturing and transmitting images, performing complex tasks including various types of feature extraction and sampling, etc. In some implementations, the processor 216 may be coupled to the memory 218 via the bus 214 to access data and instructions therefrom and store data therein. The bus 214 may couple the processor 216 to the other components of the computing device 200 including, for example, the memory 218, communication unit 220, and the data store 222.

The memory 218 may store and provide access to data to the other components of the computing device 200. In some implementations, the memory 218 may store instructions and/or data that may be executed by the processor 216. The memory 218 is also capable of storing other instructions and data, including, for example, an operating system, hardware drivers, other software applications, databases, etc. The memory 218 may be coupled to the bus 214 for communication with the processor 216 and the other components of the computing device 200.

The memory 218 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 216. In some implementations, the memory 218 may include one or more of volatile memory and non-volatile memory (e.g., RAM, ROM, hard disk, optical disk, etc.). It should be understood that the memory 218 may be a single device or may include multiple types of devices and configurations.

The communication unit 220 may include one or more interface devices for wired and wireless connectivity with the network 102 and the other components and/or components of the system 100 including, for example, the user devices 106, the image server 134, and the data store 222, etc. For instance, the communication unit 220 may include, but is not limited to, CAT-type interfaces; wireless transceivers for sending and receiving signals using Wi-Fi; Bluetooth, cellular communications, etc.; USB interfaces; various combinations thereof; etc. The communication unit 220 may be coupled to the network 102 via the signal lines 104 and 132. In some implementations, the communication unit 220 can link the processor 216 to the network 102, which may in turn be coupled to other processing systems. The communication unit 220 can provide other connections to the network 102 and to other components of the system 100 using various standard communication protocols, including, for example, those discussed elsewhere herein.

The data store 222 is an information source for storing and providing access to data. In some implementations, the data store 222 may be coupled to the components 216, 218, 220, 108, and/or 136 of the computing device 200 via the bus 214 to receive and provide access to data. In some implementations, the data store 222 may store data received from the other devices 106 and/or 134 of the system 100, and provide data access to these devices. The data store 222 may include one or more non-transitory computer-readable mediums for storing the data. In some implementations, the data store 222 may be incorporated with the memory 218 or may be distinct therefrom. In some implementations, the data store 222 may include a database management system (DBMS). For example, the DBMS could include a structured query language (SQL) DBMS, a NoSQL DMBS, various combinations thereof, etc. In some implementations, the DBMS may store data in multi-dimensional tables comprised of rows and columns, and manipulate, e.g., insert, query, update and/or delete, rows of data using programmatic operations.

The image healer engine 136 is software, code, logic, or routines for editing or modifying an image by healing the image. As depicted in FIG. 2, the image healer engine 136 may include a user interface module 202, an image analysis module 204, a refinement module 206, and a synthesis module 208. It should be understood that the refinement module 206 as indicated by the dotted line in FIG. 2 is optional and may not be required at all times during the operations and/or functionality performed by the image healer engine 136 as described elsewhere herein.

In the depicted implementation, the components 202, 204, 206, and/or 208 are electronically communicatively coupled for cooperation and communication with each other, the user application 108, the processor 216, the memory 218, the communication unit 220, and/or the data store 222. These components 202, 204, 206, and 208 are also coupled for communication with the other components (e.g. user device 106) of the system 100 via the network 102.

In some implementations, the user interface module 202, image analysis module 204, refinement module 206, and the synthesis module 208 are sets of instructions executable by the processor 216, or logic included in one or more customized processors, to provide their respective functionalities. In some implementations, the user interface module 202, image analysis module 204, refinement module 206, and the synthesis module 208 are stored in the memory 218 of the image server 134 and are accessible and executable by the processor 216 to provide their respective functionalities. In any of these implementations, the user interface module 202, image analysis module 204, refinement module 206, and/or the synthesis module 208 are adapted for cooperation and communication with the processor 216 and other components of the image server 134.

The user interface module 202 is software, code, logic, or routines for receiving inputs from a user. In some implementations, the inputs received from the user include a request for a preview image. For example, a user may launch an image enhancement application on the user device 106 and select an image to preview. The preview image may reflect a down-sampled image of an input image. In other implementations, the user interface module 202 receives an input from the user indicating a target region for healing on the preview image. For example, the target region may reflect artifacts (e.g. dust spots) present in the preview image that the user desires to remove. In some implementations, the user interface module 202 receives image data from a client, the image data including parameters associated with an input image.

In some implementations, the user interface module 202 provides a plurality of predetermined healing contours in addition to the preview image. The predetermined healing contours may include a plurality of target region dimensions for a user to apply as a target region for healing on the preview image. Examples, of the predetermined healing contours, may include, but are not limited to, a square, a triangle, a circle, and/or any other geometric configuration etc. In some implementations, the user interface module 202 receives a user-defined healing contour for a preview image. For example, a user may open a preview image in the user application 108 and sketch a particular shape on the preview image, the particular shape indicating a target region for healing. In some implementations, the user interface module 202 may send the received inputs to the image analysis module 204, which may then use those inputs to perform its acts and/or functionalities thereon.

The image analysis module 204 is software, code, logic, or routines for determining a target region on a preview image and qualitatively healing the target region associated with the preview image using a transformation. In some implementations, the image analysis module 204 receives a target region for a preview image from the user interface module 202. For example, the target region may indicate a segment of the preview image for healing. The segment of the preview image may include an artifact for example, but is not limited to, a dust spot, an object in the preview image, a face of a person, a casted shadow, etc. In some implementations, the image analysis module may receive a first input from the user interface module 202, the first input indicative of a user request for previewing an input image on a user device. In some implementations, the image analysis module 204 receives a second input from the user for a target region associated with the image preview from the user interface module 202. The image analysis module may modify the target region and/or a segment of the input image based on the target region.

In some implementations, a target region on an input image is determined automatically. For instance, the image analysis module 204 may analyze an input image and identify one or more classifying characteristics of the input image. The image analysis module 204 may then retrieve a predetermined source region from memory 218 and/or data store 222, the predetermined source region sharing similar classifying characteristics as the input image.

In some implementations, the image analysis module 204 determines a transformation for a target region associated with an input image using a plurality of scaled parameters and seamless image cloning process. In some implementations, a seamless image cloning process may be a method of image editing incorporating graph-cut segmentations or mean-value coordinates to interpolate the membrane of a target portion of an image being edited as discussed elsewhere herein. The image analysis module 204 may heal the input image based on the transformation.

In some implementations, the image analysis module 204 may receive a plurality of target regions for a preview image from the user interface module 202 and/or any other components of computing device 200. The preview image may include a down-sampled image of an input image. In some implementations, the image analysis module 204 receives image data from a client, the image data including parameters associated with the input image. The image analysis module 204 may then compute a scaling of the parameters of the image data based on a predetermined scaling factor.

In some implementations, a preview image may be a full resolution version of an input image. A target region may include dimensions m×n, the m×n dimensions of the target region reflecting pixels that are associated with intensity values. In some implementations, responsive to determining the target region on the preview image, the image analysis module 204 may analyze the preview image for a plurality of candidate source regions. For example, the image analysis module 204 may analyze pixel values associated with the target region and identify a plurality of candidate source regions in the preview image that have similar pixel values as the target region. In some implementations, a candidate source region may be transformed onto a target region responsive to similar pixel values of a candidate source region meeting a predetermined pixel threshold associated with the target region. In some implementations, the image analysis module 204 may initialize pixels of a target region and assign an offset to the target region; the image analysis module 204 may then recursively search a concentric radius in a preview image to determine pixel similarity between the target region and a candidate source region.

In some implementations, the image analysis module 204 searches a preview image for a plurality of candidate source regions based on features in the preview image, and a candidate source region of the plurality of candidate source regions may be identified and transformed onto a target region. The image analysis module 204 may communicate cooperatively with one or more other components of computing device 200 via bus 214, for computing and comparing features associated with a target region and one or more candidate source regions. Examples of features associated with the target region, may include, but are not limited to, image colors in YCbCr and a local variance of a 7×7 neighborhood associated with an input Luma. The YcbCr is indicative of a family of color spaces associated with a preview image, Y being a luma component (e.g. brightness in an image) and components Cb and Cr being blue and red difference components in the image. In some implementations, the image analysis module 204 may store the computed features in memory 218 and/or data store 222.

In some implementations, the image analysis module 204 synthesizes pixels to replace a given set of pixel for a target region in an image (e.g. preview image). For instance, the image analysis module 204 determines a pixel neighborhood for an input image, and the image analysis module 204 may initialize a synthesized pixel patch from a target region. In some implementations, the synthesized patch may be a predefined pixel kernel. The image analysis module 204 may analyze the input image for non-value pixels that border value-pixels. The image analysis module 204 may then determine a set of patches in the input image that have similarities with the non-value pixels' valued-pixels neighbors and replace the target region with the synthesized pixels. In some implementations, the image analysis module 204 synthesizes pixels for an under-sampled input image.

In some implementations, the image analysis module 204 qualitatively heals a target region on the preview image using a transformation. In some implementations, the image analysis module 204 and/or the image server 134 may retrieve a scaling factor associated with an image (e.g. down-sampled image displayed on a user device). In some implementations, the image analysis module 204 may search for a candidate source region using a transformation. The transformation may include a Covariance Matrix Adaptation Evolution Strategy (CMA-ES) method. For example, the CMA-ES performs a random sampling from a bimodal Gaussian distribution and evolution of the preview image. In some implementations, the image analysis module 204 may update the bimodal Gaussian distribution for future target regions that may include similar features associated with historical target regions assigned to one or more other images.

In some implementations, the image analysis module 204 may receive one or more restriction regions on a preview image that indicate regions that are excluded from qualifying as a candidate source region. For example, the one or more restriction regions on the preview image indicate regions that are excluded from qualifying as a candidate source region. The restriction regions may reflect an artifact or imperfection (e.g. pimple, blemish on a user's face) in the preview image that the user wishes not to be considered as a replacement for a target region. In some implementations, responsive to identifying a candidate source region in a preview image, the image analysis module 204 may transform the candidate source region onto a target region associated with the preview image.

In some implementations, the image analysis module 204 may store one or more parameters associated with a healed preview image in memory 218 and/or data store 222. An example of one or more parameters of a healed image, may include, but is not limited to, a candidate source region, a transformation associated with the candidate source region and a target region, and/or dimensions of a preview image and candidate source region. In some implementations, the acts and/or functionalities performed by the image analysis module may be performed server-side via image server 134. The image analysis module 204 may transmit one or more parameters associated with a preview image and/or healed preview image that reflects a down-sampled version of an input image; the image server 134 may apply the one or more parameters associated with the down-sampled version to perform the acts and/or functionalities on a full-sampled image. In some implementations, the image analysis module 204 may send the healed target region associated with a preview image and one or more parameters of the healed image to the refinement module 206 and/or the synthesis module 208, which may then use those inputs to perform its acts and/or functionalities thereon.

The refinement module 206 is software, code, logic, or routines for modifying a mask and/or membrane of a candidate source region when cloning the candidate source region onto a target region associated with an image (e.g. preview image). In some implementations, the refinement module 206 receives a candidate source region for a target region on a preview image from the image analysis module 204. The refinement module 206 may identify a transformation for a search region on a preview image, the search region including the transformation and the target region on the preview image.

In some implementations, the refinement module 206 determines boundary parameters of a target region and boundary parameters of a search region. The refinement module 206 may qualitatively analyze the preview image for boundary parameter similarities between the boundary parameters of the target region and the boundary parameters of the search region. The boundary parameters associated with a target region may be user-parameterized. In some implementations, the refinement module 206 may compute a boundary deviation-error for the determined boundary similarities between the target region and the search region. The boundary deviation-error may reflect a similarity confidence between the boundary parameters of the target region and the boundary parameters of the search region.

In some implementations, the refinement module 206 may compute a target region refinement using seamless cloning process. For instance, the refinement module 206 may retrieve predetermined boundary parameters for a target region from memory 218 and/or data store 222 and compute a refinement of the predetermined boundary parameter using any cloning process that is well known in the art. In some implementations, the refinement module 206 synthesizes pixels to replace a given set of pixels for a target region in an image (e.g. preview image).

In some implementations, the refinement module 206 may compute boundary parameter refinements of a target region and/or a search region using a shortest path algorithm. An example of a shortest path algorithm, may include, but is not limited to, a Dijkstra's Algorithm and/or image enhancement method. For example, the refinement module 206 may utilize the Dijkstra's algorithm to determine a path with a lowest cost in a contour around a target region and/or search region in an image (e.g. preview image). In some implementations, a lowest cost in a contour is defined as a sum of gradients along a path of an error (e.g. difference between candidate source region and target region) in addition to a sum of an error along the gradients. In some implementations, the refinement module 206 may compute boundary parameter refinements utilizing convolution pyramids. In some implementations, the refinement module 206 preserves image quality of a down-sampled image by applying convolution pyramids to an original image (e.g. full resolution image) and/or any other known image-processing configuration performed on it to preserve details in the original image.

In some implementations, the refinement module 206 performs refinements of boundary parameters associated with a target region, search region, and/or candidate source region. In some implementations, refinement of boundary parameters provides a healed image with less visible seams around the contour of the target region, search region, and/or candidate source region. In other implementations, the refinement module 206 may send the refined boundary parameters associated with a healed image to the synthesis module 208 and/or any other components of system 100, which may then use those inputs to perform its acts and/or functionalities thereon.

The synthesis module 208 is software, code, logic, or routines for providing for display a healed image to a user on a user device. In some implementations, the synthesis module 208 may receive a healed image from the image analysis module 204 and provide the healed image for display to the user via user interface module 202 on the user application 108. In other implementations, the synthesis module 208 may receive the healed image from the refinement module 206 and provide the healed image for display to the user via user interface module 202 on the user application 108. In further implementations, the synthesis module 208 may transmit the healed image to one or more other components of system 100 to perform their acts and/or functionalities thereon.

Methods

Figure 3:
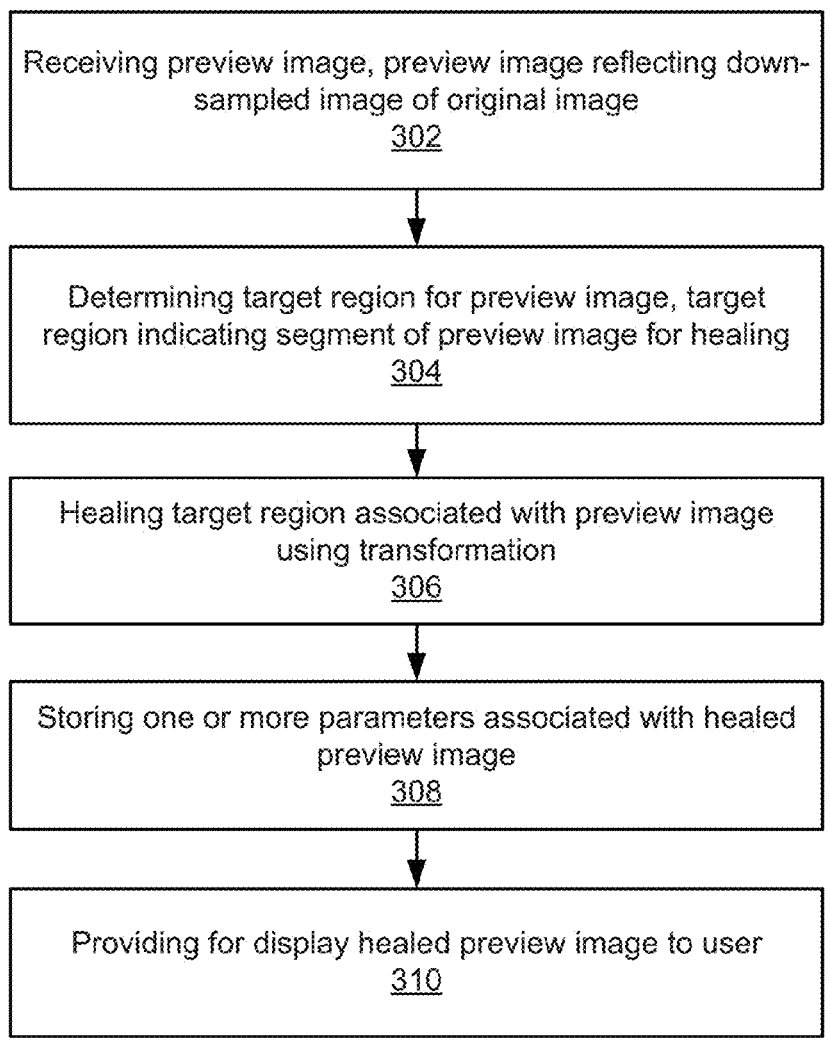
FIG. 3 is a flowchart illustrating an example method for healing an image.

FIG. 3 is a flowchart illustrating an example method for performing image healing. The method 300 begins by receiving 302 a preview image, the preview image reflecting a down-sampled image of an original image (e.g. input image). In some implementations, the operations in block 302 may be performed by the user application 108 and the down-sampled image may be down-sampled by the image healer engine 136 on the image server 134 and sent from the image server 134 to the user device 106 via the network 102. In some implementations, the down-sampled image may be generated by the user application 108a on the user device 106a and sent to another user device 106n via the network 102.

The method 300 continues by determining 304 a target region for the preview image, the target region indicating a segment of the preview image for healing. In some implementations, the operations in block 304 may be performed by the image analysis module 204. In some implementations, the image analysis module 204 automatically determines a target region for the preview image using standard image processing techniques discussed elsewhere herein to identify a discrepancy related to an artifact in the preview image and classifying a segment of the preview image including the discrepancy as the target region. In some implementations, the image analysis module 204 receives a user defined target region for a preview image from the user interface module 202 based on user input, and upon receiving the user defined target region, the image analysis module 204 may determine a target region on the preview image based on the user defined target region. For example, the target region may indicate a segment of the preview image for healing. The segment of the preview image may include an artifact for example, but not limited to, a dust spot, an object in the preview image, a person's face, a casted shadow, etc.

The method 300 continues by healing 306 the target region associated with the preview image using a transformation. In some implementations, the operations in block 306 may be performed by the image analysis module 204. In some implementations, the image analysis module 204 may search for a candidate source region using a transformation. In one implementation, the search may be implemented using the Covariance Matrix Adaptation Evolution Strategy (CMA-ES) method. The candidate source region may be used by the image analysis module 204 for a comparison of pixel values between the target region and the candidate source region. Based on the comparison, the image analysis module 204 may heal pixels included in the target region by altering the pixels to resemble the candidate source region, as discussed elsewhere herein.

The method 300 may then continue by storing 308 one or more parameters associated with the healed preview image. In some implementations, the operations in block 308 may be performed by the image analysis module 204. The image analysis module 204 may store the one or more parameters in memory 218 and/or data store 222 for future application on one or more different preview images sharing similar features, pixel values, contours, etc. Once the method 300 completes storing the one or more parameters, the method 300 may then provide 310 for display the healed image to a user. In some implementations, the operations in block 310 may be performed by the synthesis module 208. For instance, the synthesis module 208 may receive a healed image from the image analysis module 204 and provide the healed image for display to the user on the user application 108. In some implementations, healing of a target region may be multi-layered. Multi-layered healing includes healing different portions of the target region with different layers. Each different layer may apply a specific healing to correct the portion of the target region. Then the multiple different layer may be applied to the target region of an input image or combined and applied to the target region of an input image. In some implementations, a user may be able to reverse one or more sub-layers of the multi-layered healed target regions and undo the healing of the target region.

Figure 4:
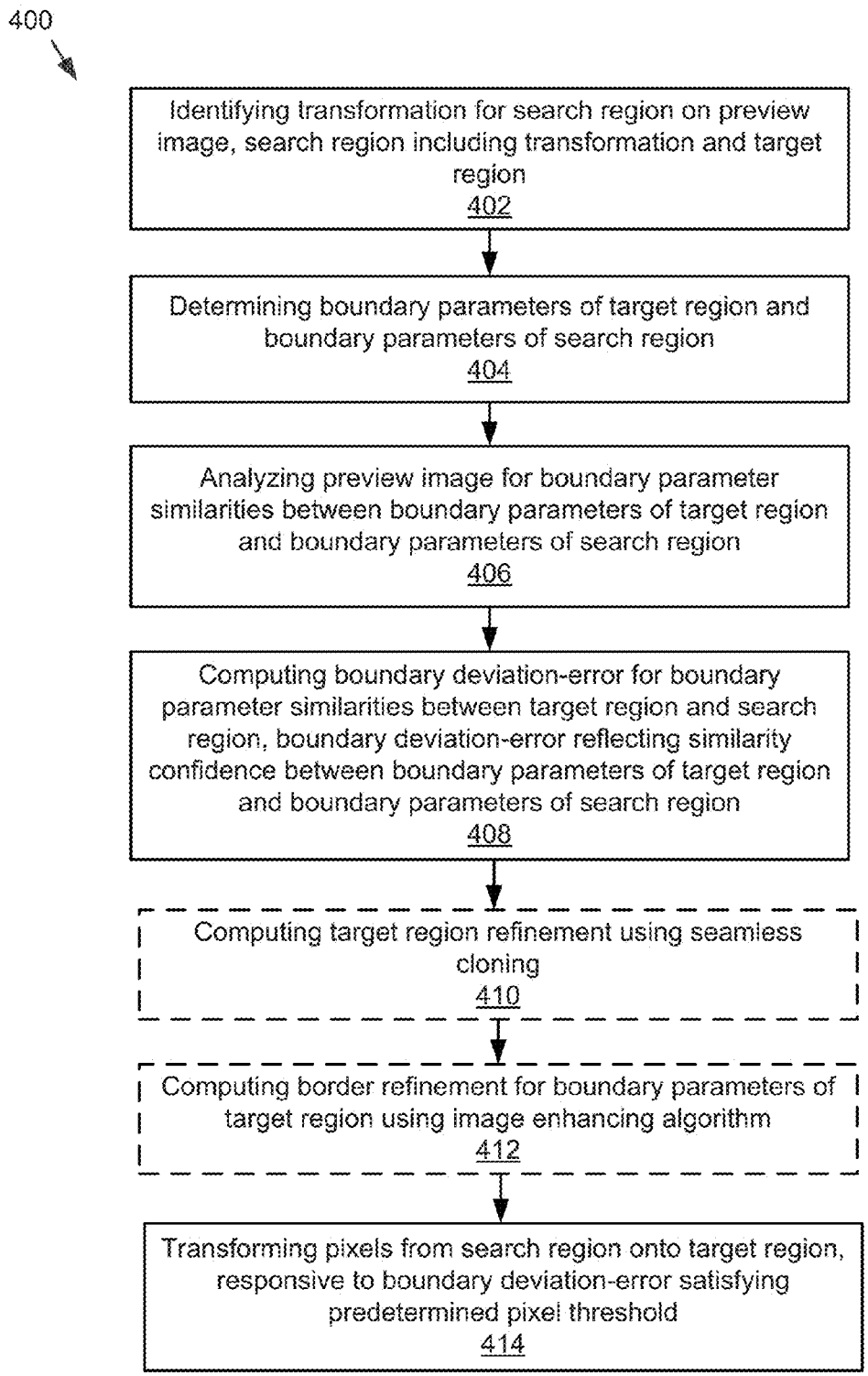
FIG. 4 is a flowchart illustrating an example method for computing border refinement on a healed image using transformation.

FIG. 4 is a flowchart illustrating an example method for computing border refinement on a healed image using a transformation. The method 400 begins by identifying 402 a transformation for a search region on a preview image, the search region including the transformation and a target region. In some implementations, the transformation for the search region may be a scaling factor applied to the portion of the image including the search region and the search region may be a portion of the preview image that includes the target region as well as a surrounding area near the target region to be healed. In some implementations, the operation performed in block 402 may be performed by the refinement module 206. For instance, the refinement module 206 may identify a transformation for a search region on a preview image by searching the preview image for one or more candidate source regions. In some implementations, the candidate source regions may be portions of the preview image showing with characteristics for the healed portion of the image to match. In some implementations, the candidate source regions may be data models of what a healed region may look like and the refinement module 206 may use the data models to transform the target region.

The method 400 may continue by determining 404 boundary parameters of the target region and boundary parameters of the search region. In some implementations, the operation performed in block 404 may be performed by the refinement module 206. For instance, the refinement module 206 may determine boundary parameters by analyzing one or more characteristics of the target region and/or the search region. An example of a characteristic of the target region and/or the search region may include, but is not limited to, pixel values associated with a contour of the target region and/or the search region.

The method 400 may continue by analyzing 406 the preview image for boundary parameter similarities between the boundary parameters of the target region and the boundary parameters of the search region. In some implementations, the boundary similarities may be a value of how similar pixels included in a target region are compared to pixels included in the search region. For example, in some implementations parameters such as color, intensity or texture between the boundary and surrounding areas can be analyzed for similarity. In some implementations, the operation performed in block 406 may be performed by the refinement module 206. The method 400 may continue by computing 408 a boundary deviation-error for the boundary parameter similarities between the target region and the search region. For instance, the boundary deviation-error may reflect a confidence measure for the similarity between the boundary parameters of the target region and the boundary parameters of the search region.

The method 400 may continue by computing 410 a target region refinement using seamless image cloning. In some implementations, the operation in block 410 may be performed by the refinement module 206. For instance, the refinement module 206 may retrieve predetermined boundary parameters for a target region from memory 218 and/or data store 222 and compute a refinement of the predetermined boundary parameter using any cloning method that is well known in the art. In some implementations, the operation in block 410 is optional and may not be part of the method 400.

The method 400 may continue by computing 412 a border refinement for boundary parameters associated with the target region using an image-enhancing method. In some implementations, the border refinement may be healing the boundary of the target region to blend with the rest of the input image. In some implementations, the operation performed in block 412 may be performed by the refinement module 206. For example, the refinement module 206 may utilize a shortest path algorithm to determine a path with a lowest cost in a contour around a target region and/or search region in an image (e.g. preview image).

The method 400 may continue by transforming 414 pixels from the search region onto the target region. In some implementations, the operation in block 414 may be performed by the refinement module 206. In some implementations, the refinement module 206 transforms pixels from the search region onto the target region, responsive to the boundary deviation-error satisfying a predetermined pixel threshold.

Figure 5A:
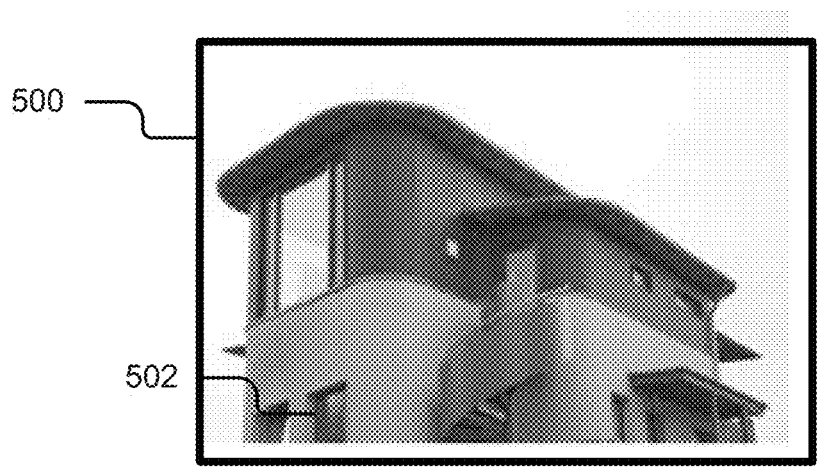
FIGS. 5A-5C are graphical illustrations of healing a target region on an input image.
Figure 5B:
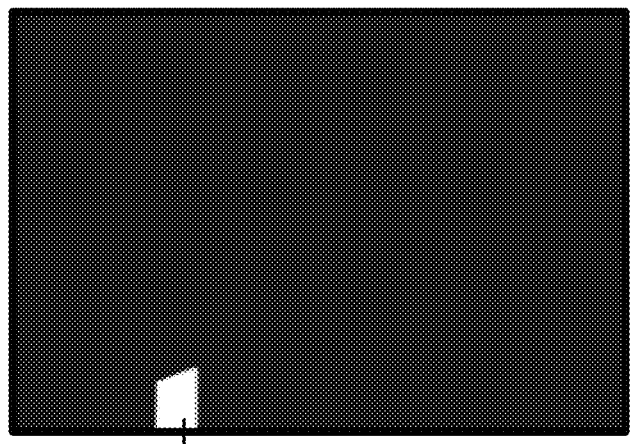
Figure 5C:
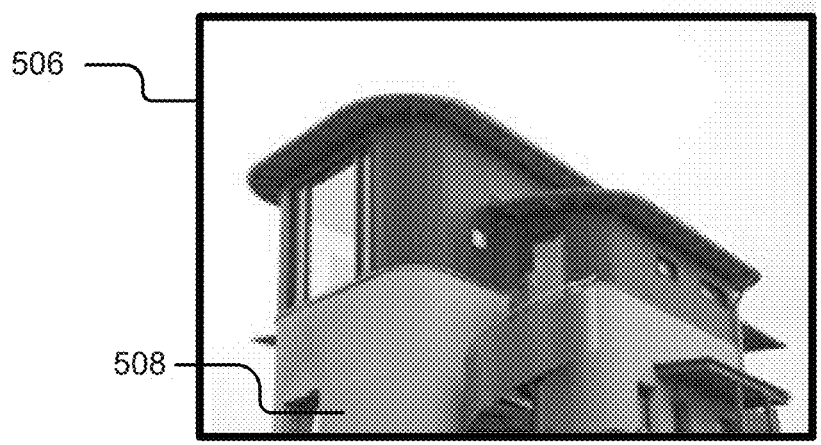

FIGS. 5A-5C are graphical illustrations of healing a target region on an input image. In particular, interface indicated by reference numeral 500 depicts an input image 500 provided to a user for editing on a user application. The input image 500 may include an object 502 (e.g. target region) that a user wishes to remove from the image. For instance, reference numeral 502 indicates that the user has selected a window associated with the input image 500 for removal. FIG. 5B depicts a mask 504 associated with the target region selected by a user, shown in FIG. 5A. In some implementations, the refinement module 206 computes a mask for a target region selected by a user in an input image. FIG. 5C depicts a healed version 506 of the input image 500. Also, as evidenced by reference numeral 508 depicting the healed target region, the healed target region no longer includes the selected window as shown in FIG. 5A.

Figure 6A:
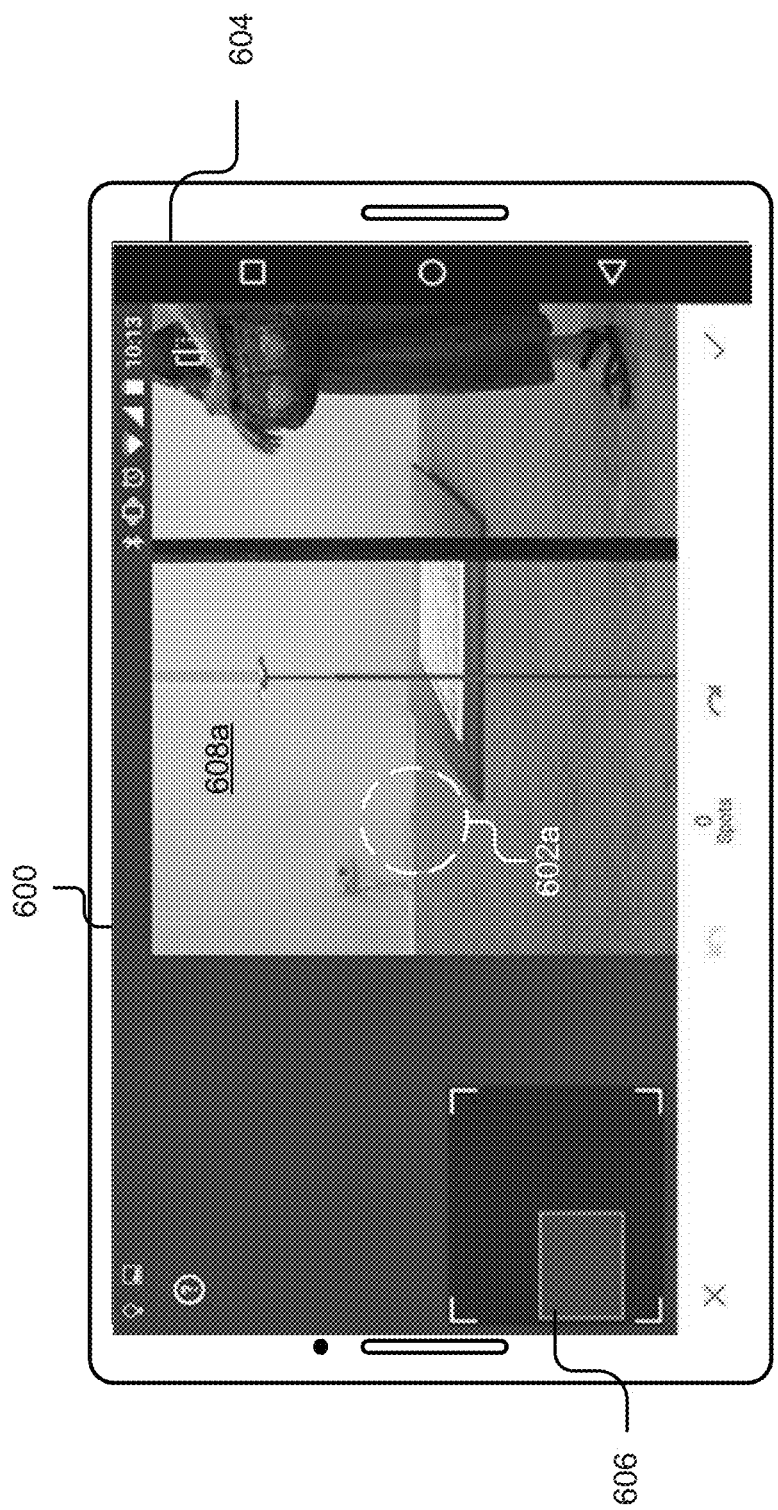
FIGS. 6A-6B are example user interfaces depicting a user specified target region for healing on an input image.
Figure 6B:
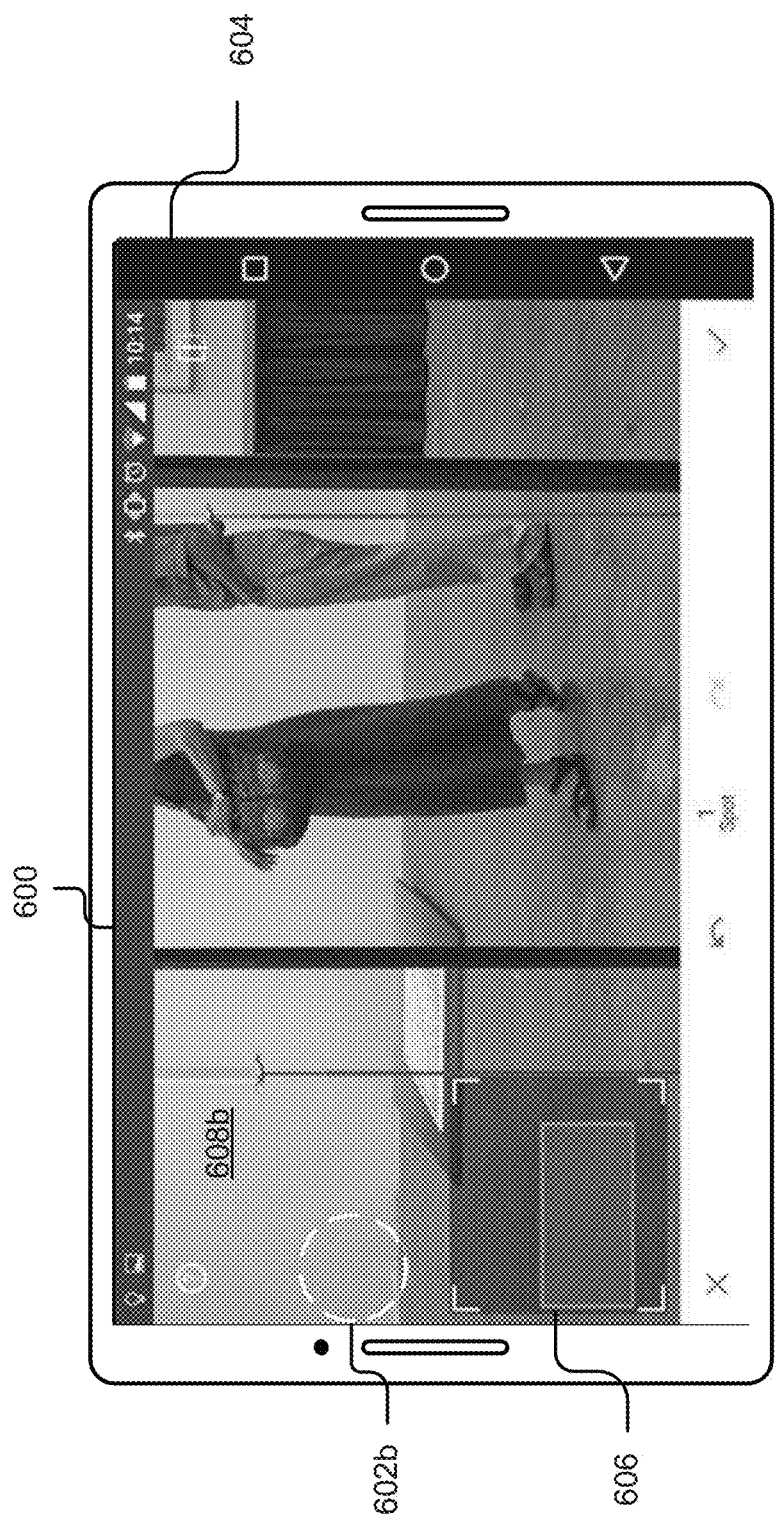

FIGS. 6A-6B are example user interfaces depicting a user specified target region for healing on an input image. Referring to FIG. 6A, a user interface 600 includes a target region 602a, a target contour selection pane 604, and a guidance zoom overlay window 606. As depicted in FIG. 6A, user interface 600 displays an image 608a (e.g. preview image) with a target region 602a indicating an object (e.g. segment) of the image 608a for healing. The target contour selection pane 604 may include a predefined square-target-region, a predefined circular-target-region, and a predefined triangular-target-region.

Referring to FIG. 6B, a user interface 600 includes a healed target region 602b, a target contour selection pane 604, and a guidance zoom overlay window 606. As depicted in FIG. 6b, user interface 600 displays a healed image 608b (e.g. healed preview image) with a healed target region 602b. As evidenced with reference numeral 602b, the object previously shown in FIG. 6A under reference numeral 602a is not present in the healed image 608b of FIG. 6B.

Figure 7A:
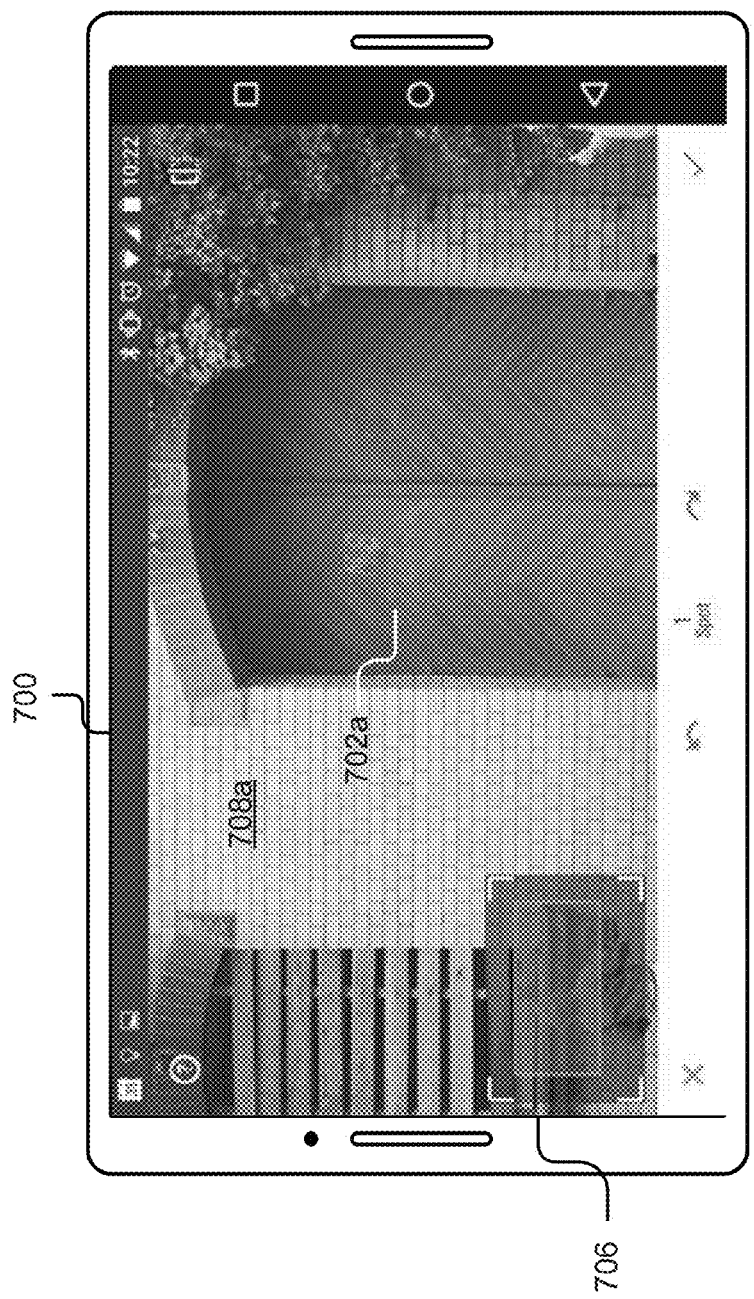
FIGS. 7A-7B are additional example user interfaces depicting a user specified target region for healing on an input image.
Figure 7B:
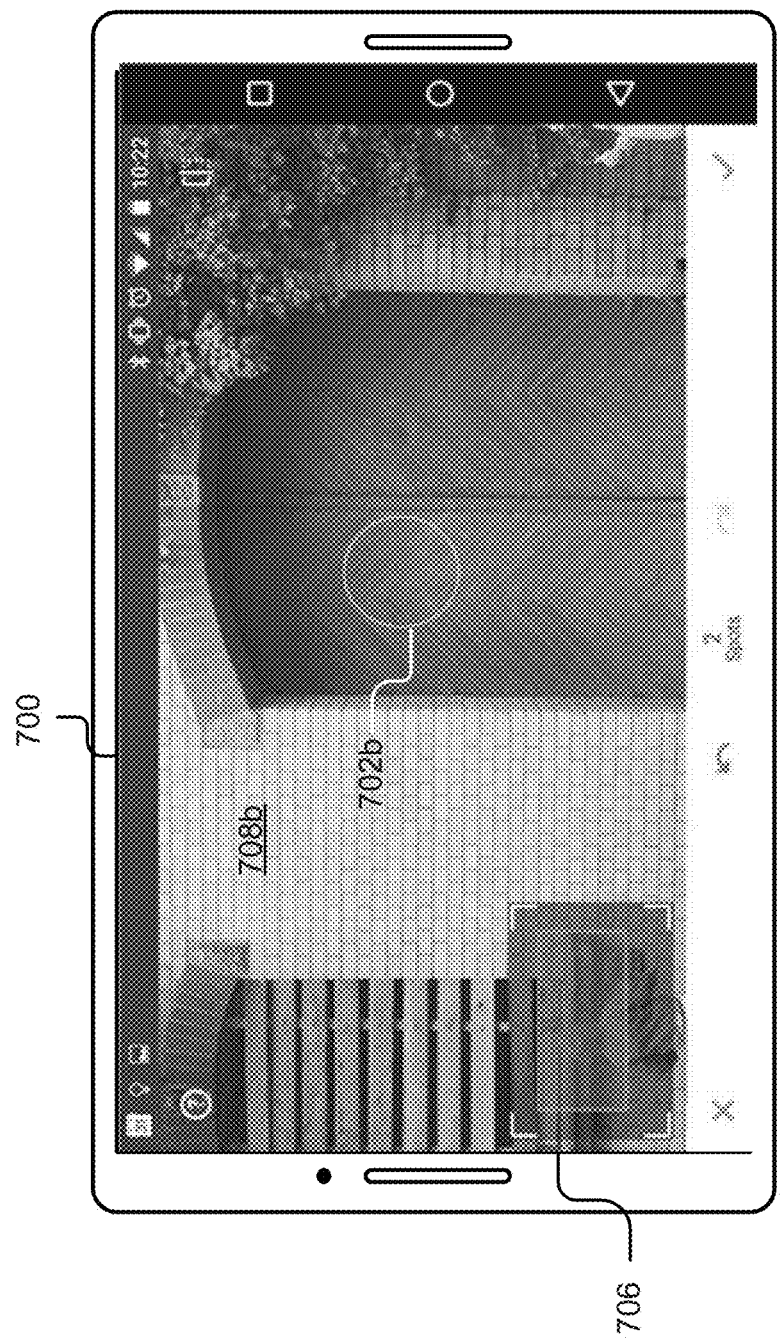

FIGS. 7A-7B are additional examples of user interfaces depicting a user specified target region for healing on an input image. Referring to FIG. 7A, a user interface 700 includes a target region 702a, a target contour selection pane 704, and a guidance zoom overlay window 706. As depicted in FIG. 7A, user interface 700 displays an image 708a (e.g. preview image) with a target region 702a indicating an object (e.g. segment) of the image 708a for healing. For instance, the target region 702a includes graffiti on a door.

Referring to FIG. 7B, a user interface 700 includes a healed target region 702b, and a guidance zoom overlay window 706. As depicted in FIG. 7b, user interface 700 displays a healed image 708b (e.g. healed preview image) with a healed target region 702b. As evidenced with reference numeral 702b, the object previously shown in FIG. 7A under reference numeral 702a is not present in the healed image 708b of FIG. 7B.

In the foregoing description, for purposes of explanation, numerous specific details are set forth in order to provide a thorough understanding of the specification. It will be apparent, however, to one skilled in the art that the technology can be practiced without these specific details. In other implementations, structures and devices are shown in block diagram form in order to avoid obscuring the description. For example, the specification is described in some implementations above with reference to user interfaces and particular hardware. However, the description applies to any type of computing device that can receive data and commands, and any peripheral devices providing services.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Reference in the specification to "some implementations" or "an implementation" means that a particular feature, structure, or characteristic described in connection with the implementation is included in at least some instances of the description. The appearances of the phrase "in some implementations" in various places in the specification are not necessarily all referring to the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or implementations containing both hardware and software elements. In some implementations, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modems and Ethernet cards are just a few of the currently available types of network adapters.

Finally, the processes, methods, and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
providing, using one or more computing devices, for display, a down-sampled preview image generated from an input image;
receiving, using one or more computing devices, a first user input identifying a target region, the target region indicating a segment of the down-sampled preview image to be modified;
determining, using the one or more computing devices, a first transformation for the target region associated with the preview image;
responsive to determining the first transformation for the target region associated with the input image, updating, using the one or more computing devices, the input image based on the first transformation without distorting image edits associated with the first transformation;
identifying a second transformation for a search region on an updated, down sampled preview image based on the updated input image, the search region including the first transformation and the target region;
determining a boundary parameter of the target region and a boundary parameter of the search region;
analyzing the preview image for boundary parameter similarities between the boundary parameter of the target region and the boundary parameter of the search region;
computing a boundary deviation-error for the boundary parameter similarities between the target region and the search region, the boundary deviation-error reflecting a similarity confidence between the boundary parameter of the target region and the boundary parameter of the search region;
transforming a set of pixels from the search region on the target region; and
providing a modified, down-sampled preview image for display to the user, the modified, down-sampled preview image including a modification that is up-scaled without distortion to generate a modified input image.

2. The computer-implemented method of claim 1, further comprising:
receiving a second user input from the user requesting to preview the input image; and
modifying the segment of the input image based upon the first user input.

3. The computer-implemented method of claim 1, wherein transforming the set of pixels from the search region on the target region is responsive to the boundary deviation-error satisfying a predetermined pixel threshold.

4. The computer-implemented method of claim 1, wherein the image data includes a size identifier of the input image.

5. The computer-implemented method of claim 1, further comprising:
receiving image data from a client, the image data including a parameter associated with an input image; and
computing a scaling of the parameter of the image data based on a predetermined scaling factor.

6. The computer-implemented method of claim 5, further comprising:
computing a target region refinement using the scaling of the parameter and seamless image cloning; and
computing a border refinement for the boundary parameter of the target region using image enhancement.

7. A computer program product comprising a non-transitory computer readable medium including a computer readable program, wherein the computer readable program when executed on a computer causes the computer to perform operations comprising:
providing, for display, a down-sampled preview image generated from an input image;
receiving a first user input identifying a target region, the target region indicating a segment of the down-sampled preview image to be modified;
determining a first transformation for the target region associated with the preview image;
responsive to determining the first transformation for the target region associated with the input image, updating the input image based on the first transformation without distorting image edits associated with the first transformation; and
identifying a second transformation for a search region on an updated, down-sampled preview image based on the updated input image, the search region including the first transformation and the target region;
determining a boundary parameter of the target region and a boundary parameter of the search region;
analyzing the preview image for boundary parameter similarities between the boundary parameter of the target region and the boundary parameter of the search region;
computing a boundary deviation-error for the boundary parameter similarities between the target region and the search region, the boundary deviation-error reflecting a similarity confidence between the boundary parameter of the target region and the boundary parameter of the search region; and
transforming a set of pixels from the search region on the target region; and
providing a modified, down-sampled preview image for display to the user, the modified, down-sampled preview image including a modification that is up-scaled without distortion to generate a modified input image.

8. The computer program product of claim 7, wherein the operations further comprise:
receiving a second user input from the user requesting to preview the input image; and
modifying the segment of the input image based upon the first user input.

9. The computer program product of claim 7, wherein transforming the set of pixels from the search region on the target region is responsive to the boundary deviation-error satisfying a predetermined pixel threshold.

10. The computer program product of claim 7, wherein the image data includes a size identifier of the input image.

11. The computer program product of claim 7, wherein the operations further comprise:
receiving image data from a client, the image data including a parameter associated with an input image; and
computing a scaling of the parameter of the image data based on a predetermined scaling factor.

12. The computer program product of claim 11, wherein the operations further comprise:
computing a target region refinement using the scaling of the parameter and seamless image cloning; and
computing a border refinement for the boundary parameter of the target region using image enhancement.

13. A system comprising:
a processor; and a memory storing instructions that, when executed, cause the system to perform operations comprising:
  providing, for display, a down-sampled preview image an input image;
  receiving a first user input identifying a target region, the target region indicating a segment of the down-sampled preview image to be modified;
  determining a first transformation for the target region associated with the preview image;
  responsive to determining the first transformation for the target region associated with the input image, updating the input image based on the first transformation without distorting image edits associated with the first transformation; and
  identifying a second transformation for a search region on an updated, down-sampled preview image based on the updated input image, the search region including the first transformation and the target region;
  determining a boundary parameter of the target region and a boundary parameter of the search region;
  analyzing the preview image for boundary parameter similarities between the boundary parameter of the target region and the boundary parameter of the search region;
  computing a boundary deviation-error for the boundary parameter similarities between the target region and the search region, the boundary deviation-error reflecting a similarity confidence between the boundary parameter of the target region and the boundary parameter of the search region; and
  transforming a set of pixels from the search region on the target region; and
  providing a modified, down-sampled preview image for display to the user, the modified, down-sampled preview image including a modification that is up-scaled without distortion to generate a modified input image.

14. The system of claim 13, wherein the operations further comprise:
  receiving a second user input from the user requesting to preview the input image; and
  modifying the segment of the input image based upon the first user input.

15. The system of claim 13, wherein transforming the set of pixels from the search region on the target region is responsive to the boundary deviation-error satisfying a predetermined pixel threshold.

16. The system of claim 13, wherein the image data includes a size identifier of the input image.

17. The system of claim 13, wherein the operations further comprise:
  receiving image data from a client, the image data including a parameter associated with an input image; and
  computing a scaling of the parameter of the image data based on a predetermined scaling factor.

18. The system of claim 17, further comprising:
  computing a target region refinement using the scaling of the parameter and seamless image cloning; and
  computing a border refinement for the boundary parameter of the target region using image enhancement.

* * * * *